(12) United States Patent
Ito

(10) Patent No.: US 6,412,755 B2
(45) Date of Patent: Jul. 2, 2002

(54) DOOR FOR CHANGING OVER AIR PASSAGE

(75) Inventor: Masahiro Ito, Takahama (JP)

(73) Assignees: DENSO Corporation; Shimizu Industry Col, Ltd., both of Kariya (JP)

( * ) Notice: Subject to any disclaimer, the term of this patent is extended or adjusted under 35 U.S.C. 154(b) by 0 days.

(21) Appl. No.: 09/779,180

(22) Filed: Feb. 8, 2001

(30) Foreign Application Priority Data

Feb. 14, 2000 (JP) ........................................ 2000-039790
Jun. 29, 2000 (JP) ........................................ 2000-196973

(51) Int. Cl.⁷ ............................................. F16K 1/226
(52) U.S. Cl. ..................... 251/173; 251/306; 454/69; 454/139
(58) Field of Search ................. 251/306, 173, 251/175, 298; 454/69, 139

(56) References Cited

U.S. PATENT DOCUMENTS 3,127,182 A * 3/1964 Wardleigh ................... 251/306
3,409,269 A * 11/1968 Fawkes ....................... 251/173
6,047,951 A   4/2000 Ito et al.
6,135,418 A * 10/2000 Hatton ........................ 137/884

FOREIGN PATENT DOCUMENTS

| GB | 543914 | * | 1/1949 | ................. 251/306 |
| GB | 873408 | * | 7/1961 | ................. 251/306 |
| JP | 1-186414 | * | 7/1989 | ................. 454/139 |

* cited by examiner

Primary Examiner—Harold Joyce
(74) Attorney, Agent, or Firm—Harness, Dickey & Pierce, PLC

(57) ABSTRACT

A sealing member 11 made of an elastic material secured to the outer peripheral edge of a door plate 10 is provided with support portions 11a and 11b that extend in a direction to intersect the door plate 10, and the support portions 11a and 11b are directly supported by the outer peripheral edge of the door plate 10. Sealing portions 11c and 11d pressed onto a sealing surface 12a of an air passage casing 12 are so formed as to be directed toward the central portion of the door from the support portions 11a and 11b, and the sealing member 11 is folded, in cross-section, from the outer peripheral edge of the door plate 10 toward the central portion of the door due to the support portions 11a and 11b and the sealing portions 11c and 11d.

7 Claims, 15 Drawing Sheets

INTERNAL AIR MODE
(EXTERNAL AIR SHUT-OUT)

EXTERNAL AIR MODE

INTERNAL AIR MODE
(EXTERNAL AIR SHUT-OUT)

EXTERNAL AIR MODE

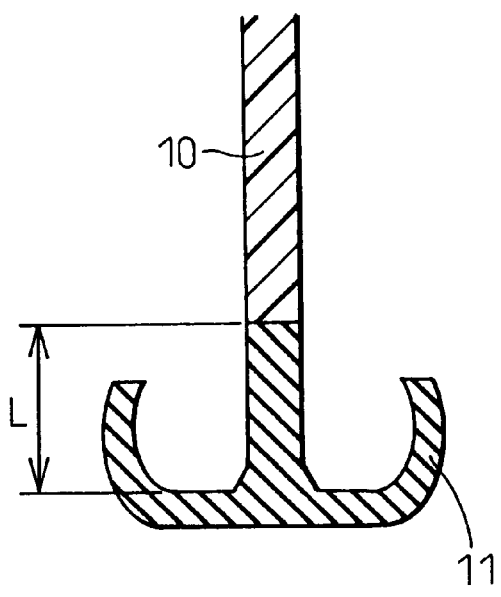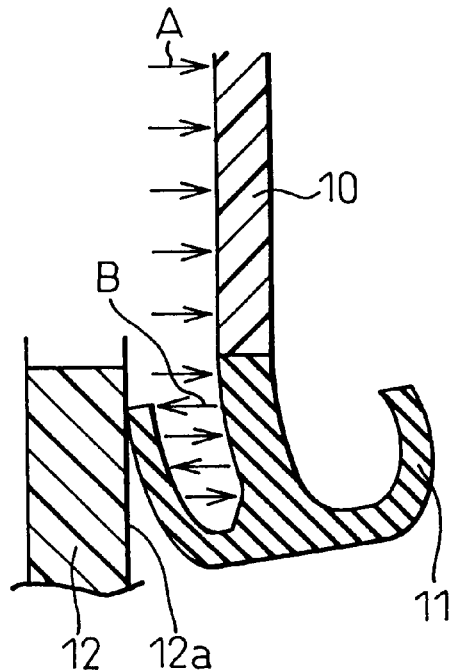

DOOR FOR CHANGING OVER AIR PASSAGE

BACKGROUND OF THE INVENTION

1. Field of the Invention

The present invention relates, in general, to improving sealing performance of a door for changing over an air passage through which the air flows, such as a door for changing over the air passage of an air conditioner for vehicles.

2. Description of the Related Art

A door for changing over the air passage used in an air conditioner for vehicles has been taught in Japanese Unexamined Patent Publication (Kokai) No. 11-180129. According to the publication a sealing member made of a rubbery elastic material is provided along the outer peripheral edge portion of a door plate, and the sealing member is elastically pressed onto the sealing surface on the side of the air passage to accomplish a sealing effect.

The sealing member made of a rubbery elastic material usually has the shape of a flat plate (single lip shape) as shown in FIGS. 22A to 22C from the standpoint of easy molding. In FIGS. 22A to 22C, reference numeral 10 denotes a door plate, 11 denotes a sealing member, 12 denotes a casing of the air passage, and 12a denotes a sealing surface thereof.

In the door for changing over the air passage provided with the sealing member 11 of the shape of a flat plate, a gap is formed between the sealing member 11 and the sealing surface 12a and the air leaks as shown in FIG. 22c when the door plate 10 and the sealing member 11 undergo elastic deformation in a direction away from the sealing surface 12a on the side of the air passage upon receiving air pressure (arrow A) in the air passage.

It can therefore be contrived to form the sealing member 11 to have a folded shape in cross section as shown in FIGS. 23A and 23B or to possess a V-shape in cross section as shown in FIGS. 24A and 24B in order to increase the amount of elastic compression of the sealing member 11 in a state where the sealing member 11 is pressed onto the sealing surface 12a. Even by employing the above folded shape or the V-shape, however, the door as a whole undergoes an elastic deformation in a direction away from the sealing surface 12a when it receives the wind pressure, again forming a gap and making it difficult to maintain the sealing performance to a sufficient degree.

Referring to FIG. 25A, further, it can be contrived to form the sealing member 11 in a double U-shape in cross section. When the door as a whole receives the wind pressure from a direction of arrow A as shown in FIG. 25B, the inside of the U-shaped portion of the sealing member 11 that has the double U-shape in cross section receives a force in the direction of arrow B (direction opposite to the arrow A), and the outer side of the U-shaped portion of the T-shaped sealing member 11 tends to be pressed onto the sealing surface 12a due to the force in the direction of the arrow B. Therefore, the sealing member having a cross sectional shape as shown in FIG. 25A is superior to the sealing members having cross sectional shapes as shown in FIGS. 22A to 24B with regard to the sealing performance.

Even with the sealing member shown in FIG. 25A, however, the support portion of the sealing member 11 is protruding by a predetermined length L in the same direction as the door plate 10 from the end surface of the outer peripheral edge of the door plate 10. When the door is closed, therefore, the sealing member 11 is deformed in a direction opposite to the sealing surface 12a. Further, when the sealing member 11 receives the wind pressure, the support portion of the predetermined length L is deformed toward the side opposite to the sealing surface as shown in FIG. 25B. This decreases the amount of elastic compression of the sealing member 11 to deteriorate the sealing performance.

SUMMARY OF THE INVENTION

In view of the above-mentioned problems, it is an object of the present invention to provide a door, for changing over an air passage, having a sealing member made of an elastic material provided along the outer peripheral edge of the door plate, in order to suppress a decrease in sealing performance due to wind pressure.

In order to accomplish the above object, according to one aspect of the present invention;

a sealing member (11) made of an elastic material secured to the outer peripheral edge of a door plate (10) is provided with support portions (11a, 11b, 11g) that extend in a direction to intersect the door plate (10), the support portions (11a, 11b, 11g) being directly supported by the outer peripheral edge of the door plate (10);

sealing portions (11c, 11d) pressed onto a sealing surface (12a) of an air passage casing (12) are so formed as to be directed toward the central portion of the door from the support portions (11a, 11b, 11g); and the sealing member (11) is folded, in cross-section, from the outer peripheral edge of the door plate (10) toward the central portion of the door due to the support portions (11a, 11b, 11g) and the sealing portions (11c, 11d).

Thus, the sealing member (11) is folded, in cross-section, from the outer peripheral edge of the door plate (10) toward the central portion of the door. Accordingly, the wind pressure acts in a direction to expand the U-shaped portion on the inside of the sealing portions (11c, 11d)(in a direction in which the sealing portion is pressed onto the sealing surface).

Besides, the support portions (11a, 11b, 11g) extending in the direction to intersect the door plate (10) are directly supported by the outer peripheral edge of the door plate (10). Therefore, the sealing member (11) is firmly supported by the highly rigid door plate (10), and is not entirely deformed in the lee side despite of receiving the wind pressure.

Thus, the effect of the wind pressure is overcome, and the sealing performance is favorably maintained by the door for changing over the air passage.

According to another aspect of the present invention, there is provided a door for changing over the air passage, comprising a butterfly door (D1) having a rotary shaft (13) arranged at the central portion of a door plate (10), wherein:

sealing members (11, 11') made of an elastic material are secured to the outer peripheral edges on one side and on the other side of said door plate (10) with said rotary shaft (13) as a boundary;

the sealing member (11) on one side of said door plate (10) is arranged on the lee side of a sealing surface (12a) of an air passage casing (12), and the sealing member (11') on the other side of the door plate (10) is arranged on the windward side of the sealing surface (12a) of said air passage casing (12); and the sealing member (11) on said one side is folded so as to be pressed onto said sealing surface (12a) by the wind pressure, and said sealing member (11') on the other side of said door plate (10) is formed in the shape of a flat plate so as to be pressed onto said sealing surface (12a) by the wind pressure.

In the butterfly door (D1) which rotates about the rotary shaft (13) at the central portion of the door plate (10), the sealing member (11) on one side located on the lee side of the sealing surface (12a) is folded and exhibits a favorable sealing function by utilizing the wind pressure. The sealing member (11') on the other side is located on the windward side of the sealing surface (12a), and exhibits a favorable sealing function though it has the shape of a flat plate.

According to a further aspect of the present invention, there is provided an air conditioner for a vehicle having an internal air/external air change-over door (23) for opening and closing an internal air intake port (21) and an external air intake port (22); wherein said internal air/external air change-over door (23) has door plates (23a, 23b) and sealing members (28, 29) made of an elastic material secured to the outer peripheral edges of the door plates (23a, 23b);

said sealing members (28, 29) are pressed onto sealing surfaces (30 to 33) of said internal air intake port (21) and of said external air intake port (22); and said sealing members (28, 29) are further folded so as to be pressed onto said sealing surfaces (30 to 33) by the wind pressure of the external air from said external air intake port (22).

By using the internal air/external air change-over door (23), therefore, the sealing members (28, 29) are pressed onto the sealing surfaces (30 to 33) by the wind pressure of the external air, to obtain a favorable sealing function by utilizing the wind pressure.

Reference numerals in parentheses attached to means designate correspondence to concrete means appearing later in the description of the embodiments.

The present invention may be more fully understood from the description of the preferred embodiments of the invention, as set forth below, together with the accompanying drawings.

BRIEF DESCRIPTION OF THE DRAWINGS

In the drawings

FIGS. 25A and 25B are views illustrating a still further conventional door for changing over the air passage.

DESCRIPTION OF THE PREFERRED EMBODIMENTS

First Embodiment

Figure 1:
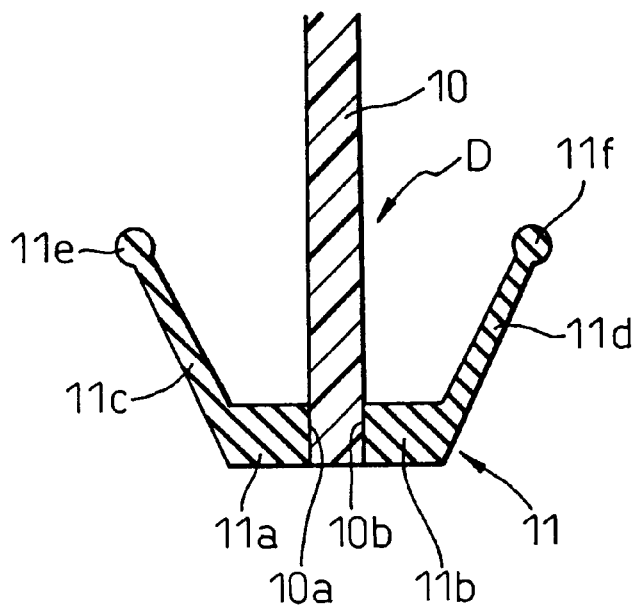
FIG. 1 is a sectional view illustrating a major portion of a door for changing over the air passage according to a first embodiment of the present invention, and is a sectional view along the line X—X in FIG. 2.
Figure 2:
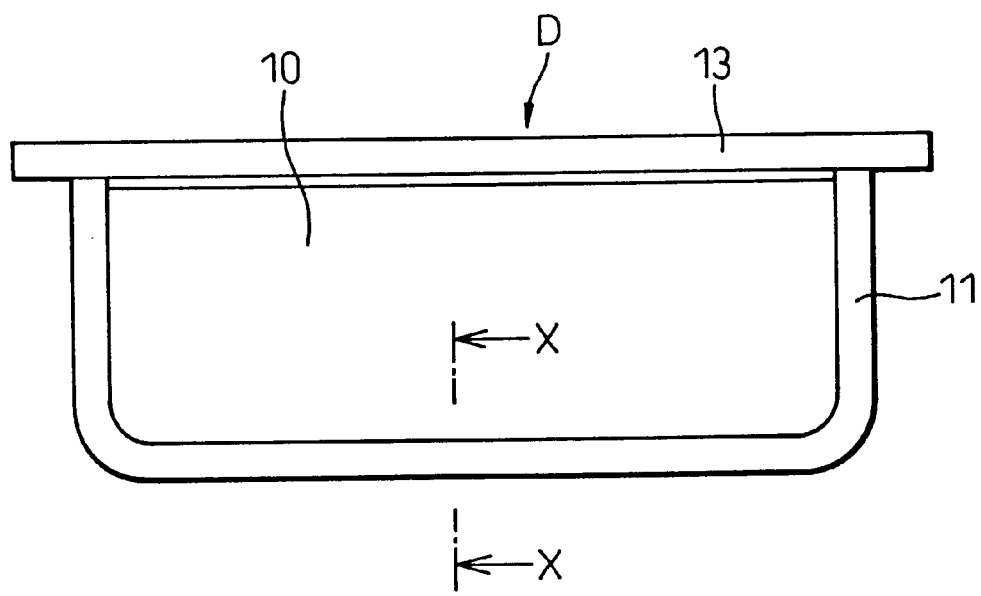
FIG. 2 is a front view of the door for changing over the air passage of FIG. 1.
Figure 3:
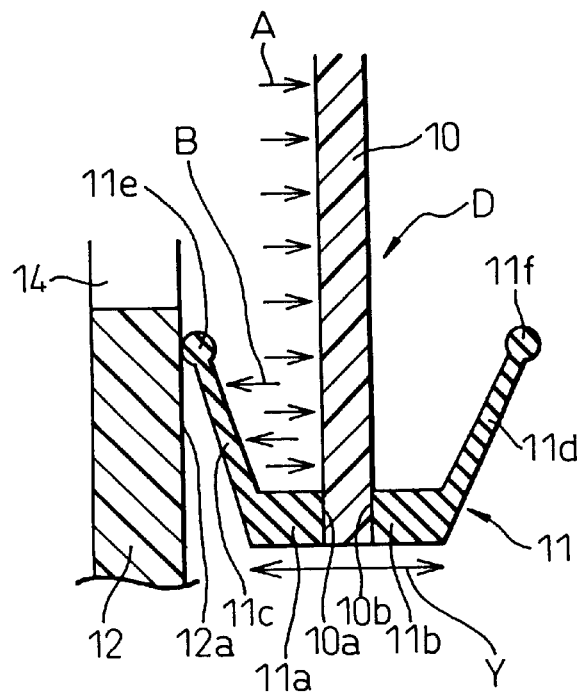
FIG. 3 is a view illustrating the action of the door for changing over the air passage of FIG. 1.

FIGS. 1 to 3 are views illustrating a door D for changing over the air passage according to a first embodiment, wherein FIG. 1 is a sectional view along line X—X in FIG. 2. The door D for changing over the air passage is used as a blow-out-mode door for changing the air flow over to a face blow-out opening, to a defroster blow-out opening and to a foot blow-out opening in an air conditioner for vehicles.

Referring to FIG. 2, the door D for changing over the air passage has a door plate (main door body) 10 of a rectangular shape. The door plate 10 constitutes a highly rigid portion (or, in other words, a non-elastic portion) made of such a material as resin or the like. A rotary shaft 13 is integrally molded along the long side which is one side of the door plate 10. Due to this rotary shaft 13, the door D is rotatably supported by an air passage casing 12 shown in FIG. 3.

Various openings are formed in the air passage casing 12, and FIG. 3 shows one opening 14. A sealing surface 12a is formed along the peripheral edge of the opening 14 in the air passage casing 12.

Referring to FIG. 2, a sealing member 11 is secured in a U-shape (like a picture frame) to the outer peripheral edge where the rotary shaft 13 is not located. The sealing member 11 constitutes a lip seal along the outer peripheral edge of the door plate 10, and is made of a rubbery elastic material or, more concretely, an elastomer (high molecular rubbery elastic material).

As the resin material that constitutes the door plate 10 of the door D, there can be preferably used a resin such as polypropylene, nylon, ABS or the like. A filler such as glass fiber may be contained to increase the strength. As a concrete example of elastomer that forms the sealing member 11, there can be preferably used an olefin elastomer which is a thermoplastic elastomer (TPE).

The door plate 10 and the rotary shaft 13 are integrally molded together in advance and, then, the sealing member 11 is integrally molded on the door plate 10 by an injection molding method. During this integral molding, the sealing member is secured to the outer peripheral edge of the door plate 10.

Next, the sectional shape of the sealing member 11 which constitutes the feature of the present invention will be described in detail. Referring to FIGS. 1 and 3, the sealing member 11 is so formed, in cross-section, as to be folded toward the central portion of the door from the surfaces 10a, 10b on both sides of the outer peripheral edge of the door plate 10. Concretely, the folded shape includes support portions 11a, 11b and sealing portions 11c, 11d. The support portions 11a, 11b extend in a direction to intersect the door plate 10 and, more concretely, are so formed as to extend in a vertical direction from the surfaces 10a, 10b of the outer peripheral edge.

The sealing portions 11c, 11d are so formed as to expand aslant and outward toward the central portion of the door from the ends of the support portions 11a, 11b.

Further, abutting surfaces 11e, 11f of a nearly circular shape in cross section are formed at the ends of the sealing portions 11c, 11d, and a surface pressure on the sealing surface is elevated due to the circular shape of the abutting surfaces 11e, 11f. The sealing portions 11c, 11d are thin plates having a thickness of about 1.0 to 1.5 mm, so that the door can be operated by a decreased force.

Next, described below is the action of the door D for changing over the air passage according to the first embodiment. Referring to FIG. 3, the opening 14 is closed as the abutting surface 11e at the end of the sealing portion 11c of the sealing member 11 is pressed onto the sealing surface 12a on the side of the air passage casing 12. Upon operating a blower, not shown, of the air conditioner, the wind pressure of the air that is blown acts on the door D from the direction of arrow A.

Here, the sealing member 11 is folded in cross section so as to be headed toward the central portion of the door from the surfaces 10a, 10b of the outer peripheral edge of the door plate 10. Therefore, the wind pressure acts in a direction to press the abutting surface lie at the end of the sealing portion 11c onto the sealing surface 12a as indicated by an arrow B in the U-shaped portion on the inside of the sealing portion 11c.

Further, the sealing member 11 is directly secured to the surfaces 10a, 10b on both sides of the outer peripheral edge of the door plate 10 by support portions 11a, 11b that extend in a direction to intersect the door plate 10, and whereby the central portion of the sealing member 11 is firmly supported by the highly rigid door plate 10. Accordingly, the sealing member 11 as a whole is not deformed by the wind pressure in the direction of arrow A. That is, according to the first embodiment, the sealing member 11 as a whole is not deformed in the direction of arrow A unlike that of FIG. 25B.

Thus, the sealing performance is favorably prevented from being decreased by the effect of wind pressure, owing to synergism, in that the wind pressure acts in a direction as indicated by the arrow B inside the sealing portion 11c to press the abut surface 11e onto the sealing surface 12a and that the sealing member 11 as a whole is not deformed in the direction of the arrow A.

FIG. 3 illustrates a state in which the opening 14 and the sealing surface 12a of the air passage casing 12 are arranged on one side only of the door D in the direction Y of rotation. If the opening 14 and the sealing surface 12a are arranged on the other side of the door D, too, in the direction Y of rotation, however, the openings 14 on both sides in the direction Y of rotation can be opened and closed by the door D.

Second Embodiment

Figure 4:
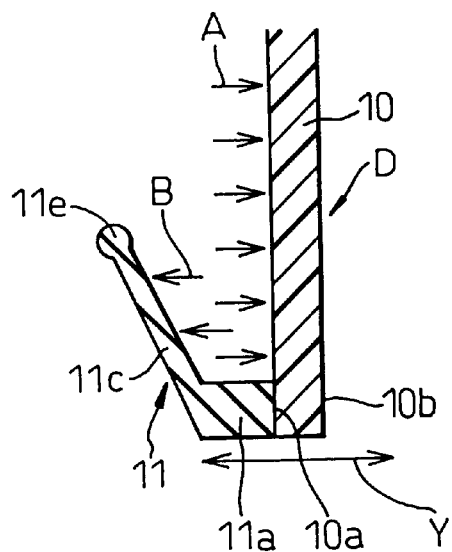
FIG. 4 is a sectional view illustrating a major portion of the door for changing over the air passage according to a second embodiment of the present invention.

FIG. 4 illustrates a second embodiment wherein the sealing member 11 having a folded shape is arranged on one surface 10a only of the front and back surfaces 10a, 10b of the outer peripheral edge of the door plate 10 of the door D. In other respects, this embodiment is the same as the first embodiment.

Third Embodiment

Figure 5:
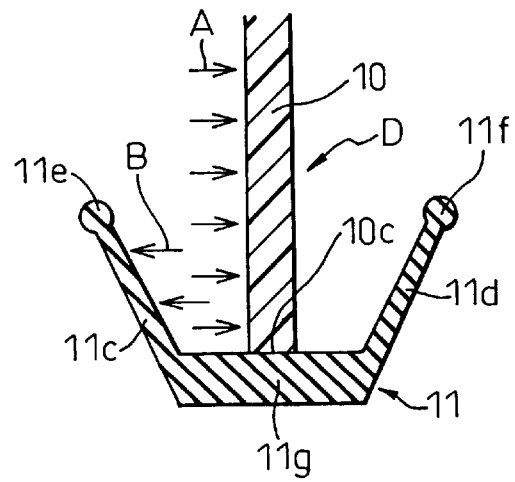
FIG. 5 is a sectional view illustrating a major portion of the door for changing over the air passage according to a third embodiment of the present invention.

FIG. 5 illustrates a third embodiment. In the first embodiment, support portions 11a, 11b of the sealing member 11 are arranged on both the front and back surfaces 10a, 10b of the outer peripheral edge of the door plate 10 of the door D and, hence, the outer peripheral edge of the door plate 10 is sandwiched by the two support portions 11a and 11b. According to the third embodiment, a support portion 11g is provided between the sealing portions 11c and 11d positioned on both the front and back surfaces of the door plate 10 to directly couple the sealing portions 11c and 11d, and the central portion of the support portion 11g is secured to the end surface 10c of the outer peripheral edge of the door plate 10.

The sealing member 11 having such a shape in cross section, too, exhibits the same action and effect as those of the first embodiment.

Fourth Embodiment

Figure 6:
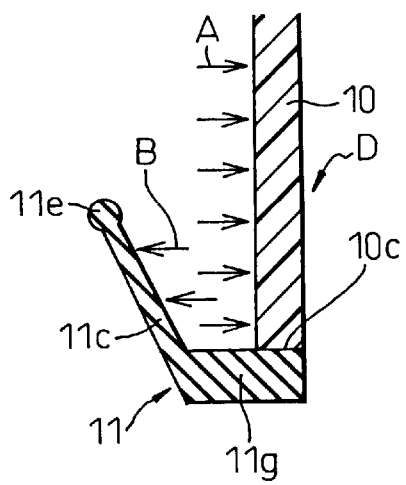
FIG. 6 is a sectional view illustrating a major portion of the door for changing over the air passage according to a fourth embodiment of the present invention.

FIG. 6 illustrates a fourth embodiment. In the third embodiment in this case, the support portion 11g and the sealing portion 11c are provided only on one of either the front surface or the back surface of the door plate 10 of the door D.

Fifth Embodiment

Figure 7:
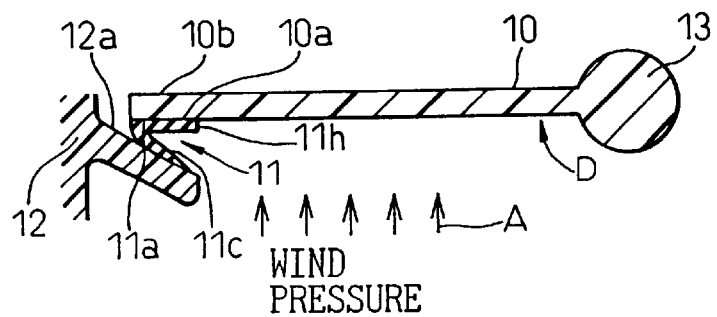
FIG. 7 is a sectional view illustrating a major portion of the door for changing over the air passage according to a fifth embodiment of the present invention.

FIG. 7 illustrates a fifth embodiment. In the second embodiment of FIG. 4, the support portion 11a of the sealing member 11 is provided with an extended portion 11h that extends along the outer peripheral edge surface 10a of the door plate 10 of the door D in order to increase the area on where the sealing member 11 and the door plate 10 are secured together.

Sixth Embodiment

Figure 8:
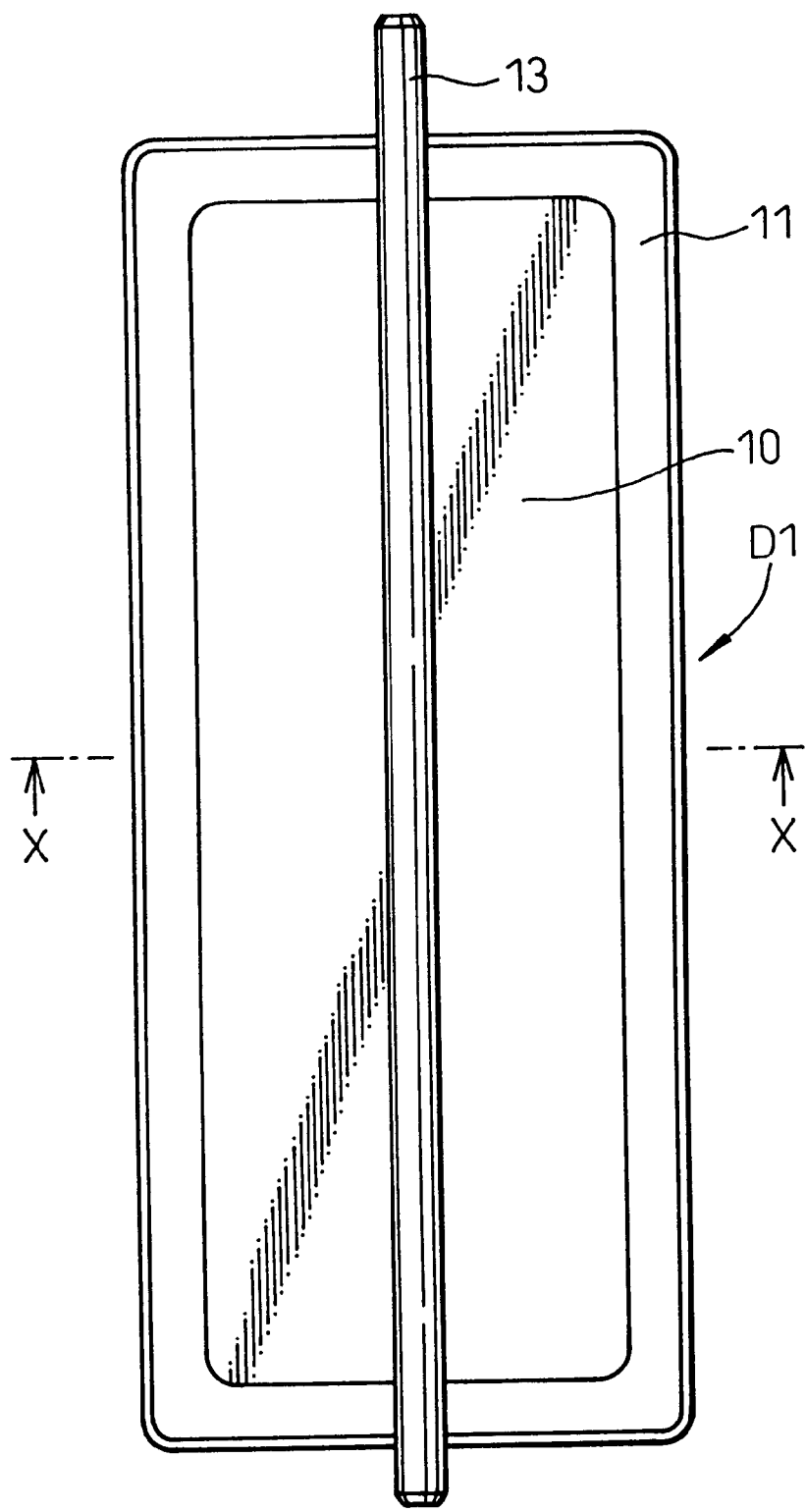
FIG. 8 is a front view of the door for changing over the air passage, which is a comparative example, according to a sixth embodiment of the present invention.

The above embodiments have dealt with the doors D of the type in which the rotary shaft 13 was arranged at an end on one side of the door plate 10 of a rectangular shape as shown in FIG. 2. The invention, however, can be further applied to a butterfly door D1 having a rotary shaft 13 arranged at the central portion of the door plate 10 of a rectangular shape as shown in FIG. 8.

Figure 9:
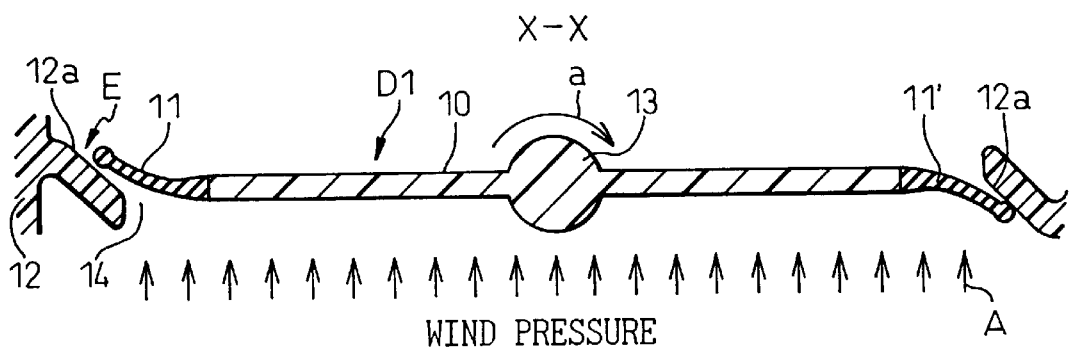
FIG. 9 is a sectional view along the line X—X in FIG. 8.

In this butterfly door D1 as shown in FIG. 9, sealing members 11 and 11' made of an elastic material of the shape of a flat plate are secured to the outer peripheral edges of one side and the other side of the door plate 10 with the rotary shaft 13 as a boundary, and the sealing member 11 on one side of the door plate 10 is arranged on the lee side of the sealing surface 12a of the air passage casing 12. The sealing member 11' on the other side of the door plate 10 is arranged on the windward side of the sealing surface 12a of the air passage casing 12. Upon turning the door D1 in the direction of an arrow A from the state of FIG. 9 with the rotary shaft 13 as a center, therefore, the opening 14 is opened.

However, when this butterfly door D1 receives wind pressure from the direction of an arrow A as shown in FIG. 9, the sealing member 11 on one side (portion E) of the door plate 10 is elastically deformed in a direction away from the sealing surface 12a of the air passage case 12 due to the wind pressure, whereby a gap is formed between the sealing member 11 and the sealing surface 12a permitting air to leak.

Figure 10:
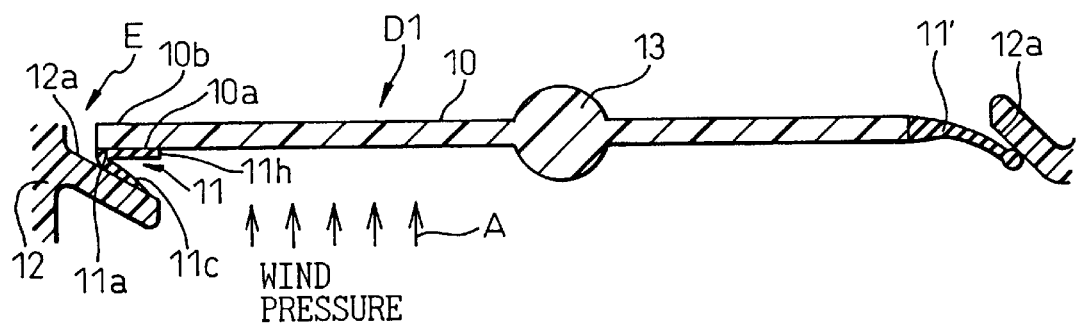
FIG. 10 is a sectional view (which corresponds to the sectional view along the line X—X in FIG. 8) of the door for changing over the air passage according to the sixth embodiment of the present invention.

According to a sixth embodiment, therefore, the sealing member 11 on one side (portion E) of the door plate 10 of the butterfly door D1 is formed, as shown in FIG. 10, in a folding shape like in the fifth embodiment of FIG. 7 in order to prevent the leakage of the air at the portion E where the sealing portion 11c of the sealing member 11 is pressed onto the sealing surface 12a due to the wind pressure. The sealing member 11' on the other side of the door plate 10 is located on the windward side of the sealing surface 12a. Despite of its flat plate shape, therefore, the sealing member 11' is pressed onto the sealing surface 12a due to the wind pressure, and the air does not leak.

Seventh Embodiment

Figure 11:
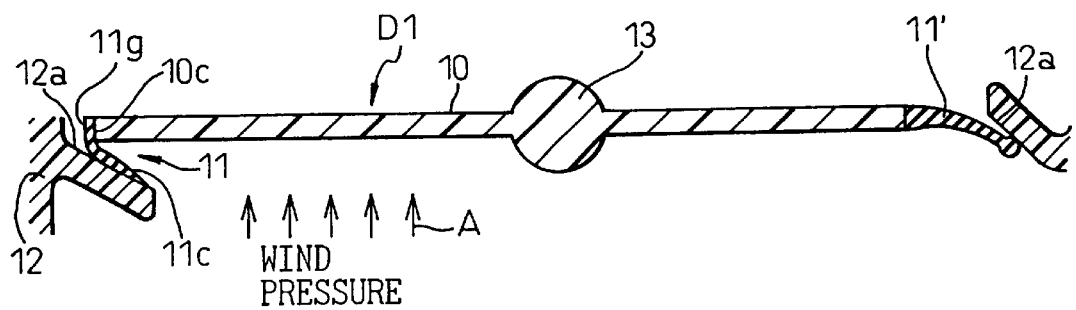
FIG. 11 is a sectional view (which corresponds to the sectional view along the line X—X in FIG. 8) of the door for changing over the air passage according to a seventh embodiment of the present invention.

FIG. 11 illustrates a seventh embodiment which is concerned with the butterfly door D1 like the above sixth embodiment. In this case, the sealing member 11 on one side (portion E) of the door plate 10 is folded like that of the fourth embodiment shown in FIG. 6 in order to prevent the leakage of the air at the portion E.

Eighth Embodiment

The first embodiment has dealt with the case where the door D for changing over the air passage was applied to the blow-out-mode door of the air conditioner for vehicles. Now, an eighth embodiment is concerned with a door for changing over the air passage that is applied to an internal air/external air change-over door of the air conditioner for vehicles.

Figure 12:
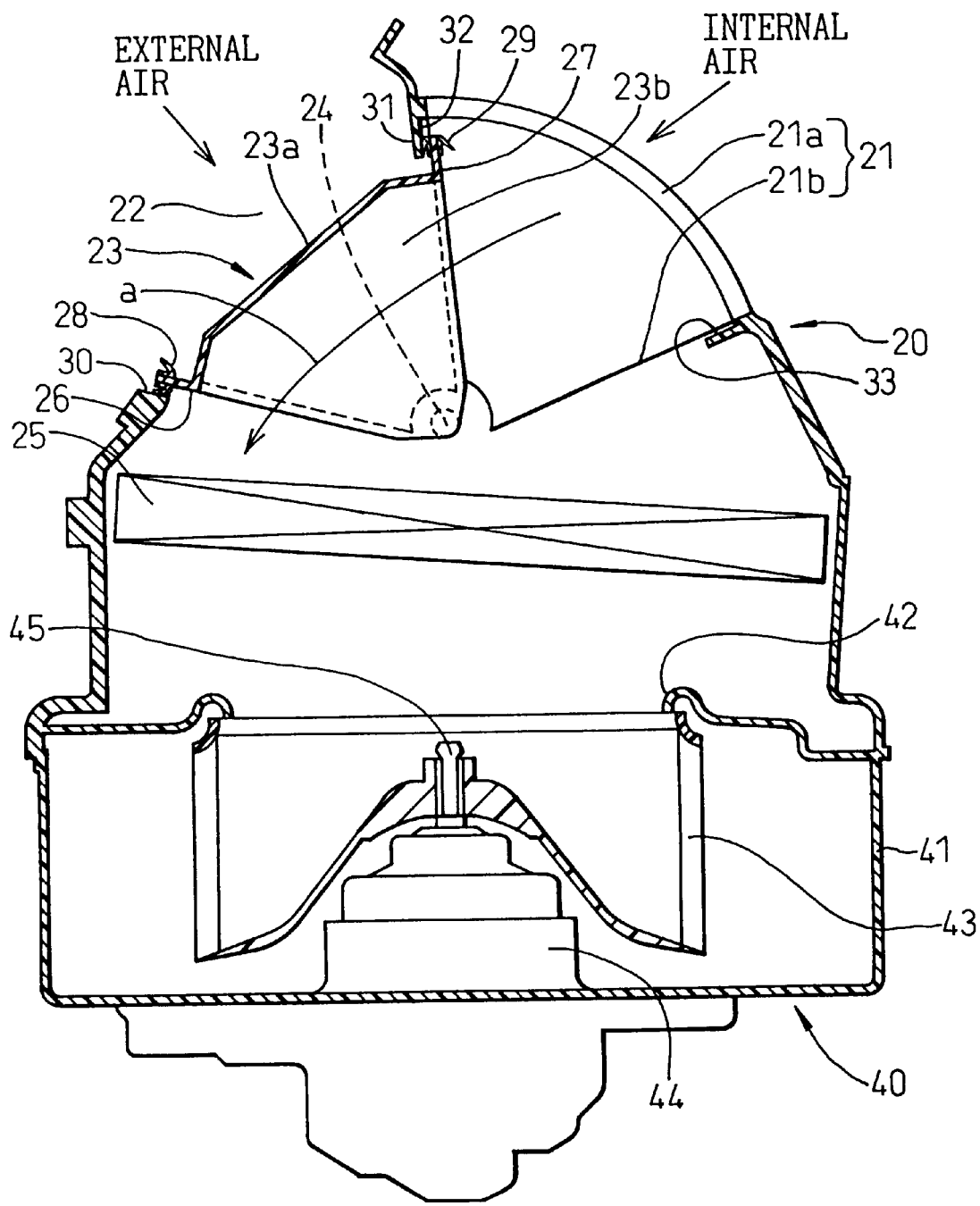
FIG. 12 is a sectional view of a blower unit in the air conditioner for vehicles according to an eighth embodiment of the present invention.

Briefly described below, first, is a blower unit that includes an internal air/external air change-over device of the air conditioner for vehicles. FIG. 12 illustrates the blower unit according to the eighth embodiment in an internal air mode.

The blower unit shown in FIG. 12 is usually arranged in a portion on the side of the passenger's seat under an instrument panel at the front part in the compartment of an automobile. An internal air/external air change-over device 20 is disposed in an upper part of the blower unit, and a blower 40 is disposed on the lower side of the internal air/external air change-over device 20.

The internal air/external air change-over device 20 has an internal air intake port 21 for taking-in the air in the compartment and an external air intake port 22 for taking-in the external air. These two intake ports 21 and 22 are opened and closed by the internal air/external air change-over door 23. The internal air/external air change-over door 23 is a rotary door that rotates about the rotary shaft 24, and the details will be described later.

An air filter 25 is disposed in the internal air/external air change-over device 20 on the downstream of the rotary shaft 24 of the internal air/external air change-over door 23. The air filter 25 comprises a filter member of a corrugated Japanese paper or a porous urethane foam, which is supported by a frame made of a resin. Here, the air filter 25 removes dust and dirt from the air. As required, an adsorbing member that adsorbs offensive odor components may be added to the filter member to exhibit a deodorant function.

The blower 40 has a scroll casing 41 made of a resin. The scroll casing 41 has a bell-mouth-like intake port 42 located immediately on the downstream of the air filter 25. A blower fan 43 which is a centrifugal multi-vane fan (Sirocco fan) is arranged at the central portion of the scroll casing 41, so that the air taken in through the intake port 42 by the rotation of the fan 43 flows outward in the radial direction of the fan 43. The blower fan 43 rotates by being coupled to the rotary shaft 45 of the drive motor 44.

An air conditioner unit (not shown) is coupled to the air outlet (not shown) of the scroll casing 41, and the air that is blown passes through the air conditioner unit and is blown into the compartment after it is cooled, dehumidified or adjusted for temperature by reheating in a known manner.

Figure 13:
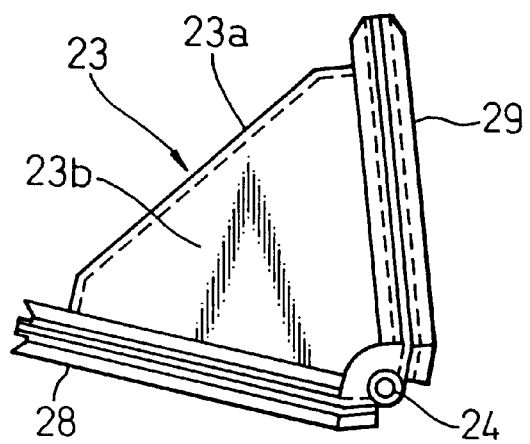
FIG. 13 is a side view of an internal air/external air change-over door shown in FIG. 12.

Next, the rotary internal air/external air change-over door 23 will be concretely described with reference to FIGS. 13 and 14. The door 23 has an outer peripheral wall surface 23a that extends in the direction (circumferential direction) in which the door rotates, and the ends on both sides of the outer peripheral wall surface 23a in the axial direction are coupled to the rotary shafts 24 by fan-shaped side plates 23b.

The size of the door plate constituted by the outer peripheral wall surface 23a and by the fan-shaped side plates 23b, is so selected as to be large enough to close the internal air intake port 21. Further, the external air intake port 22 is closed by the outer peripheral wall surface 23a.

The internal air intake port 21 is opened and closed not only by the outer peripheral wall surface 23a of the internal air/external air change-over door 23 but also by the fan-shaped side plates 23b. Therefore, provision is made of openings 21b opposed to the fan-shaped side plates 23b on both sides in the axial direction in addition to the opening 21a opposed to the outer peripheral wall surface 23a. The openings 21b are formed in the wall surfaces of the casing of the internal air/external air change-over device 20 on both sides thereof in a direction perpendicular to the surface of the paper in FIG. 12.

Therefore, the internal air intake port 21 has a shape that is bent like a gate opening from a portion opposed to the outer peripheral wall surface 23a of the rotary door 23 through up to the portions opposed to both side plates 23b. This provides an increased opening area for taking in the internal air in order to accomplish a maximum cooling ability by the internal mode. On the other hand, the external air intake port 22 is a plain opening of a normal rectangular shape.

As will be understood from the foregoing description, the internal air/external air change-over door 23 is of the rotary type having the outer peripheral wall surface 23a that extends in the direction in which the door rotates, the rotary shafts 24, and the side plates 23b for connecting them together. This makes it possible to open and close not only the opening 21a on the outer peripheral side of the door in the internal air intake port 21 but also the side openings 21b in the axial direction. This offers an advantage of increasing the internal air intake amount due to an increase in the areas for taking in the internal air.

The rotary shafts 24 in the rotary internal air/external air change-over door 23 are protruding outward in the axial direction from the positions of rotational center of the fan-shaped side plates 23b on both sides in the axial direction of the door 23. The rotary shafts 24 on both sides in the axial direction are rotatably supported by bearing holes (not shown) in the wall surfaces of the casing of the internal air/external air change-over device 20.

Figure 14:
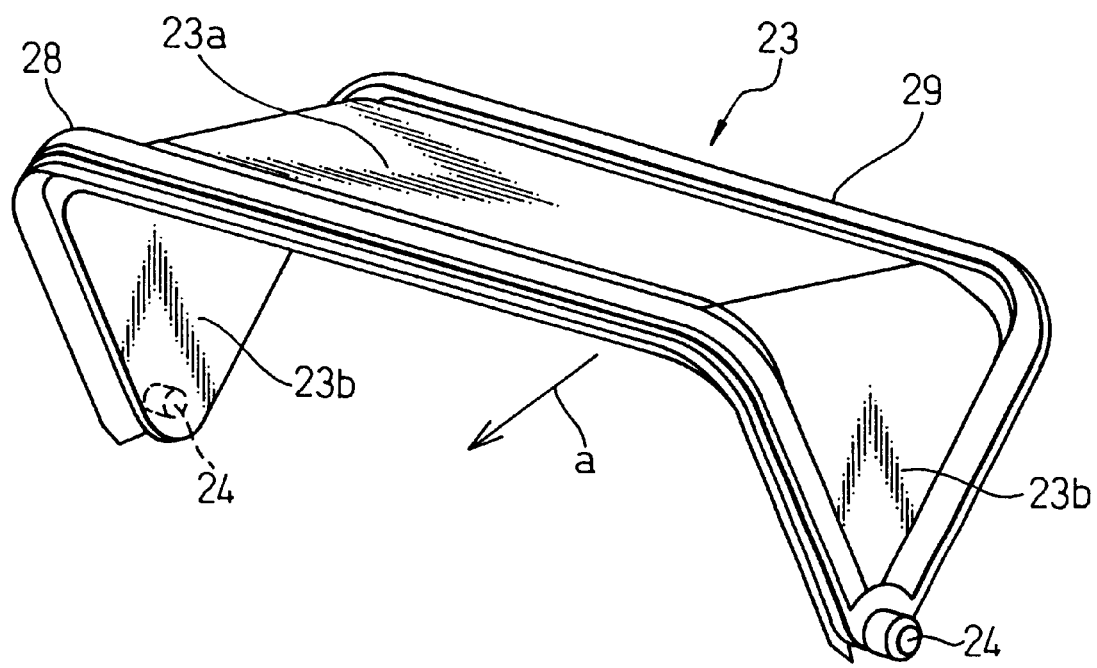
FIG. 14 is a perspective view of the internal air/external air change-over door shown in FIG. 12.

In the rotary internal air/external air change-over door 23, further, space in the inside between the outer peripheral wall surface 23a and the fan-shaped side plates 23b are directly opened to the outer side, and the air freely flows through space on the inside as indicated by an arrow a in FIGS. 12 and 14. The internal air/external air change-over door 23 is integrally molded so as to include the above elements 23a, 23b and the rotary shaft 24 by using a resin such as polypropylene.

Next, described below is a sealing structure of the above rotary internal air/external air change-over door 23. The door-sealing structure is of the lip seal type to operate the door with a decreased force. Flange portions 26 and 27 are integrally formed on the surfaces at the peripheral edges of the door plate of the door 23, i.e., on the surfaces at the peripheral edges of the outer peripheral wall surface 23a and of the side plates 23b. Lip-like (thin plate) sealing members 28 and 29 are secured to the ends of the flange portions 26 and 27.

One sealing member 28 is located at one end of the door plate in the direction (circumferential direction) in which the door rotates, and the other sealing member 29 is located on the other end of the door plate in the direction (circumferential direction) in which the door rotates. These two sealing members 28 and 29 are made of an elastomer (high-molecular rubbery elastic material) like the above-mentioned sealing members 11 and 11'.

Figure 15:
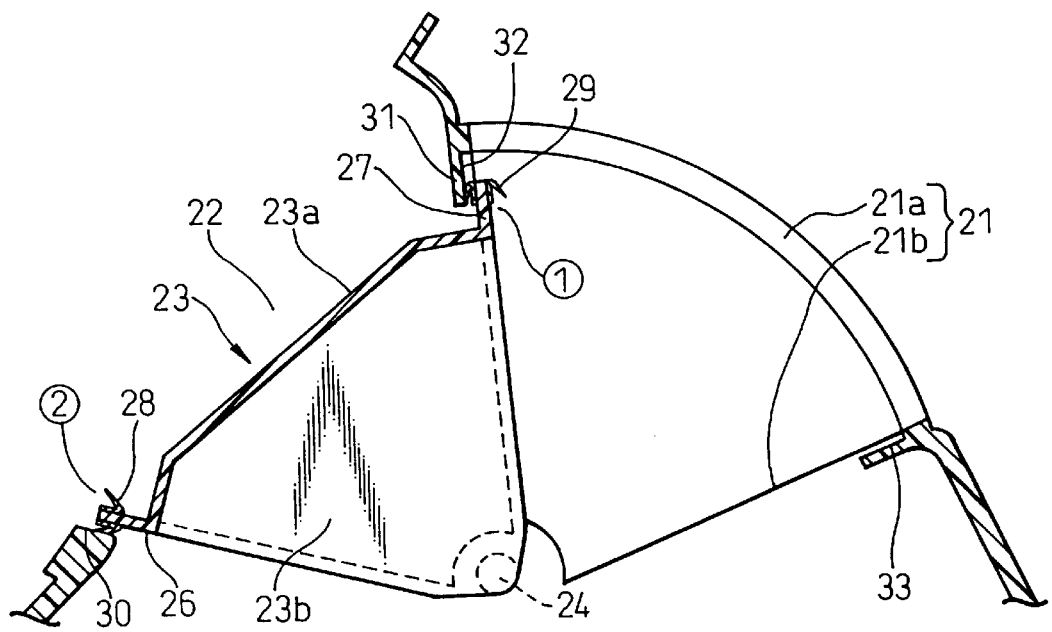
FIG. 15 is a sectional view illustrating a major portion of FIG. 12 on an enlarged scale, and illustrates a state of an internal air mode.
Figure 16:
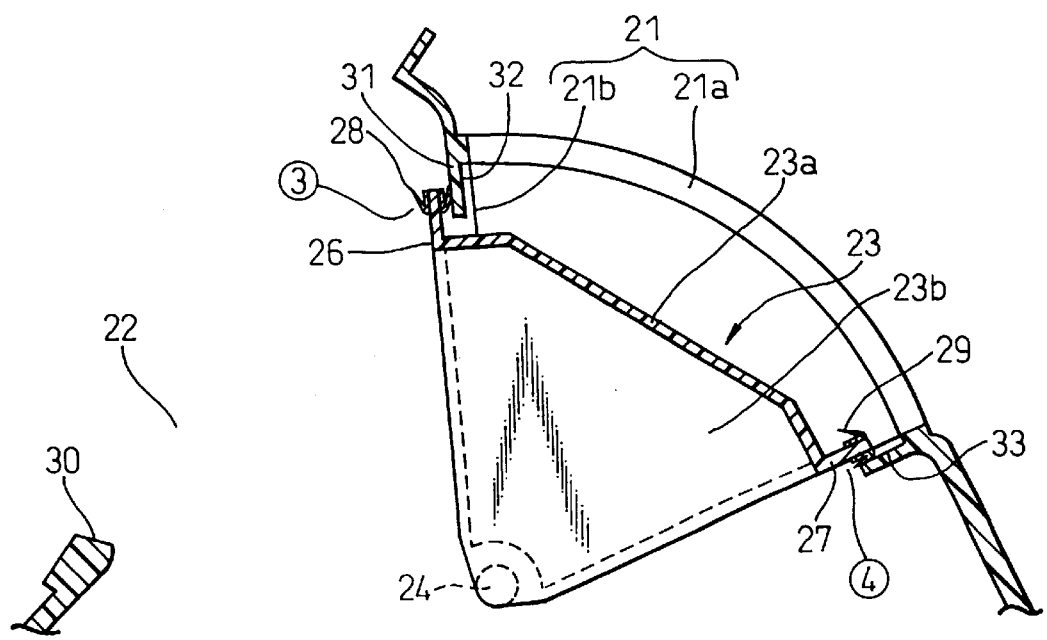
FIG. 16 is a sectional view illustrating a major portion of FIG. 12 on an enlarged scale, and illustrates a state of an external air mode.

Concrete shapes of the two sealing members 28 and 29 will now be described with reference to FIGS. 15 to 17. FIGS. 15 and 16 are views illustrating the internal air/external air change-over device 20 of FIG. 12 on an enlarged scale, wherein FIG. 15 illustrates the one in the internal air mode and FIG. 16 illustrates the one in the external air mode. FIGS. 17A to 17D are views illustrating, on an enlarged scale, the portions ①to ④ of FIGS. 15 and 16. The other sealing member 29 has a folded shape in cross section like that of the sealing member 11 (FIG. 1) of the first embodiment.

That is, the other sealing member 29 is folded from the outer edge (end) of the flange portion 27 toward the front surfaces of the door plate (outer peripheral wall surface 23a and side plates 23b). Accordingly, the sealing member 29 has support portions 29a and 29b that correspond to the support portions 11a and 11b of FIG. 1, and has sealing portions 29c and 29d that correspond to the sealing portions 11c and 11d of FIG. 1. Further, the sealing member 29 is provided with extended portions 29e and 29f similar to the extended portion 11h of the sealing member 11 (FIG. 7) of the fifth embodiment.

Another sealing member 28 is folded in a manner opposite to that of the sealing member 29 in cross section. That is, the sealing member 28 has support portions 28a and 28b arranged at portions deviated toward the front surface of the door plate (outer peripheral wall surface 23a and side plate 23b) by a predetermined size from the outer edge (end) of the flange portion 26. The sealing portions 28c and 28d are folded from the support portions 28a and 28b toward the directions to separate away from the outer peripheral wall surface 23a and from the surfaces of the side plates 23b. Further, the sealing member 28 is provided with extended portions 28e and 28f for increasing the areas for adhesion to the flange portion 26.

The opening edges of the internal air intake port 21 and of the external air intake port 22 are provided with sealing surfaces 30, 31, 32 and 33 corresponding to the sealing surfaces 12a of the first to fifth embodiments, and the sealing portions 28c, 28d, 29c and 29d of the sealing members 28 and 29 of the internal air/external air change-over door 23 are elastically deformed to come into surface contact with (pressed onto) the sealing surfaces 30, 31, 32 and 33.

Figure 18:
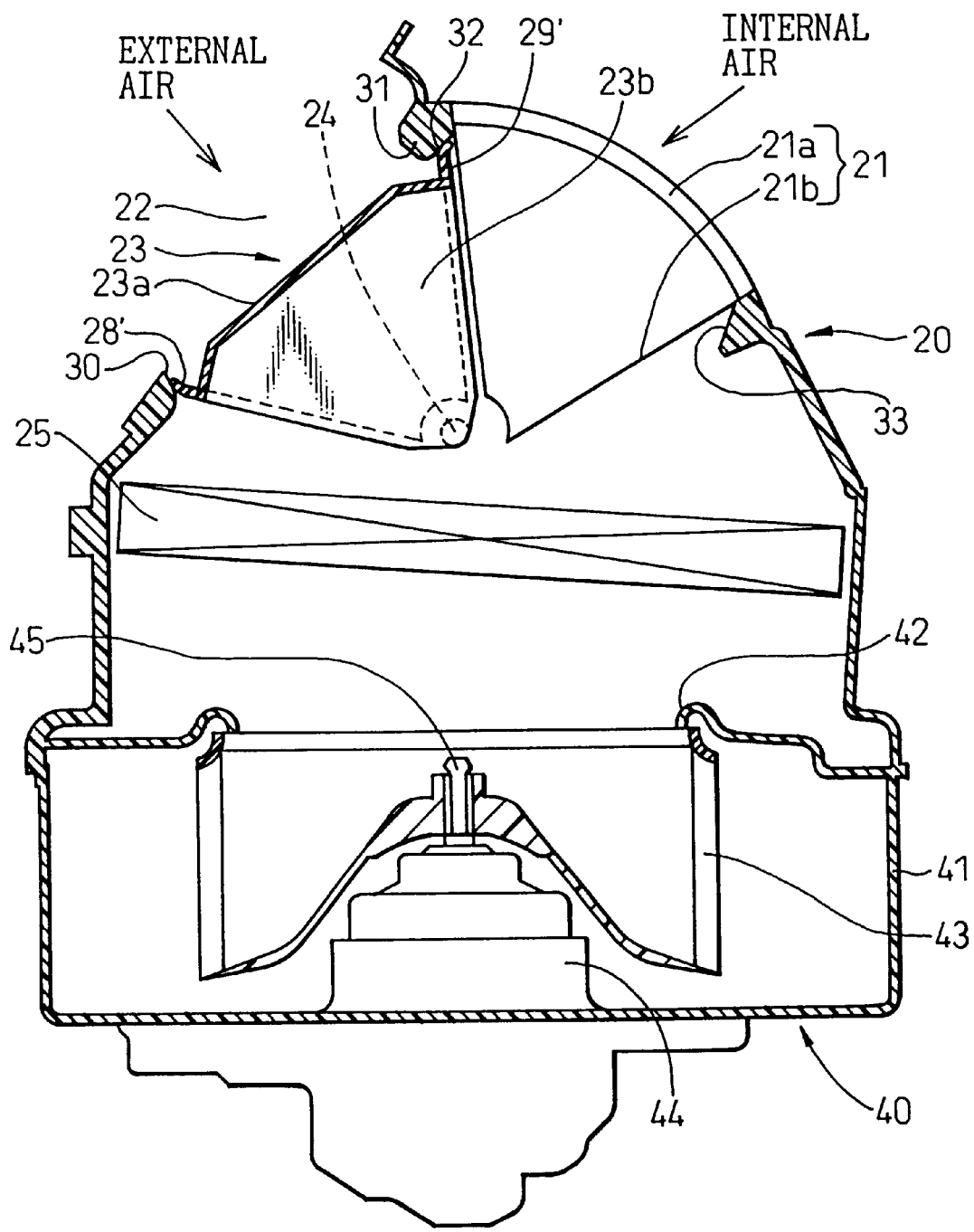
FIG. 18 is a sectional view of a blower unit, which is a comparative example, according to the eighth embodiment of the present invention.
Figure 19:
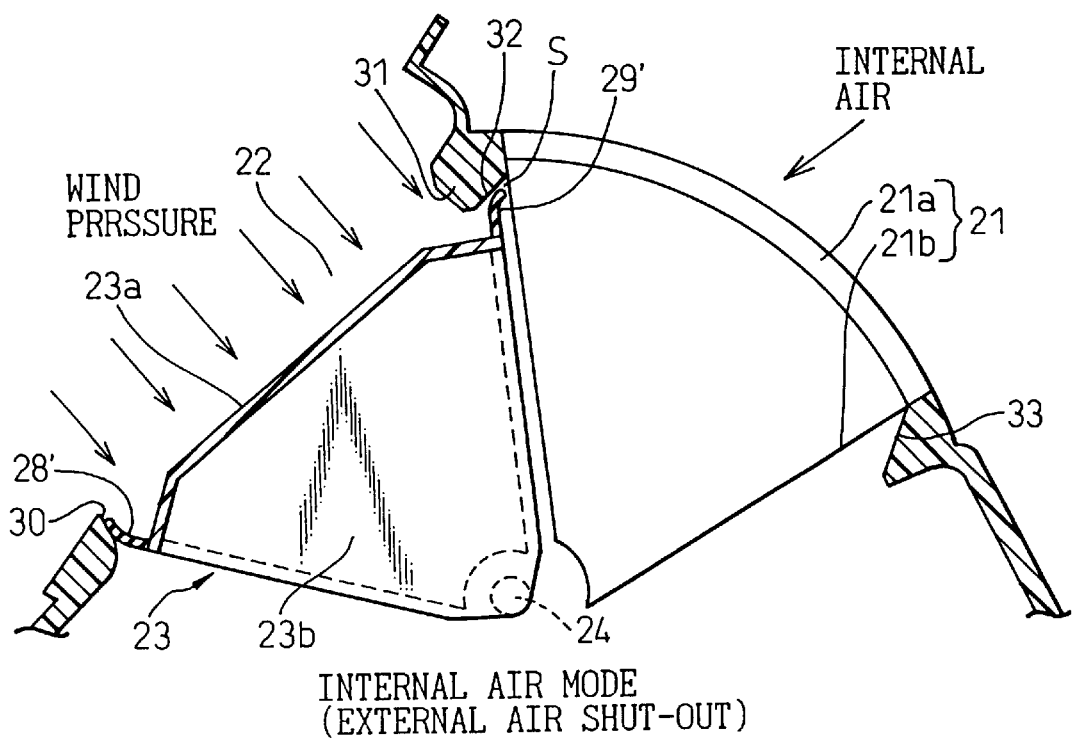
FIG. 19 is a sectional view illustrating a major portion of FIG. 18 on an enlarged scale, and illustrates a state of an internal air mode.
Figure 20:
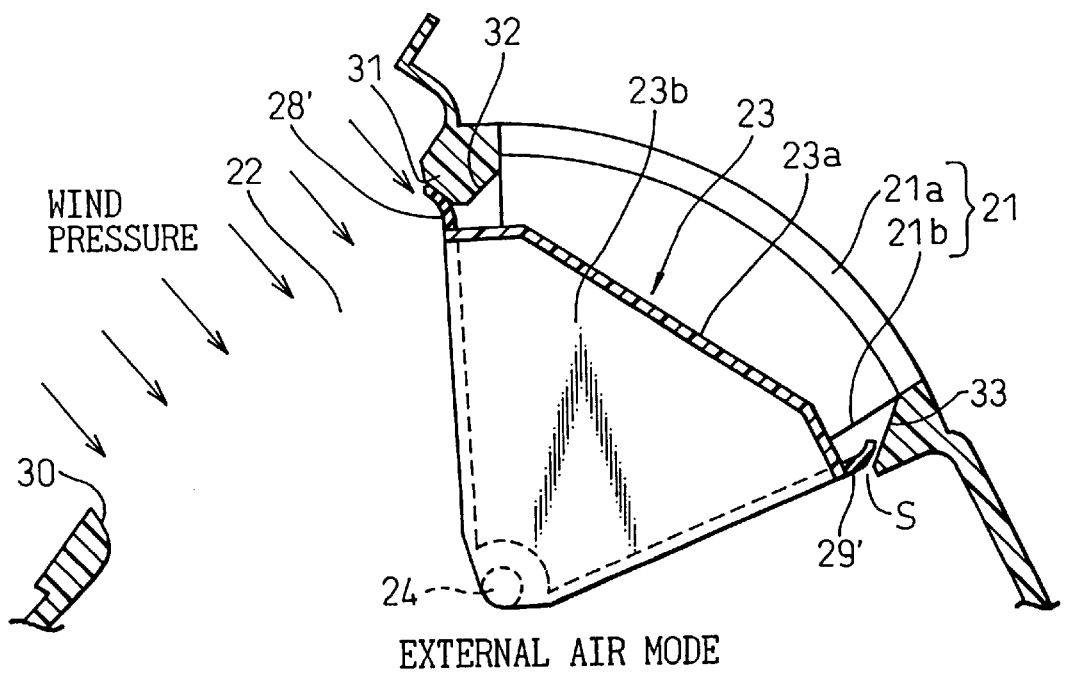
FIG. 20 is a sectional view illustrating a major portion of FIG. 18 on an enlarged scale, and illustrates a state of an external air mode.
Figure 21A:
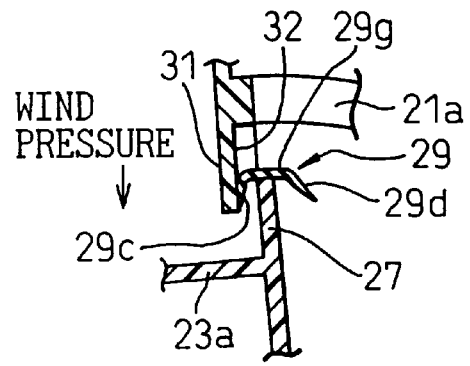
FIGS. 21A to 21D are sectional views illustrating, on an enlarged scale, the sealing member portions according to a ninth embodiment of the present invention, and corresponds to FIGS. 17A to 17D.
Figure 21B:
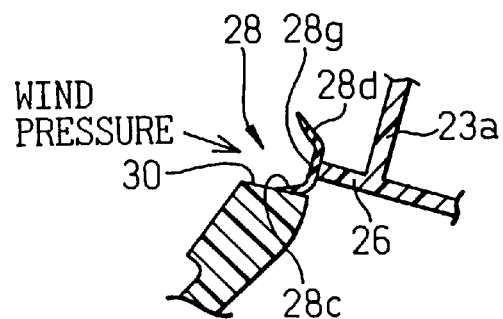
Figure 21C:
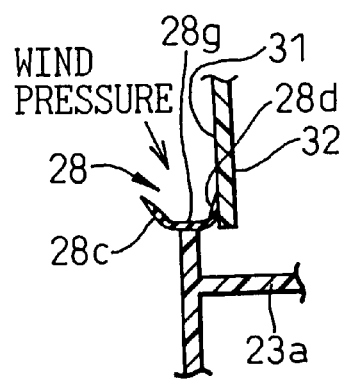
Figure 21D:
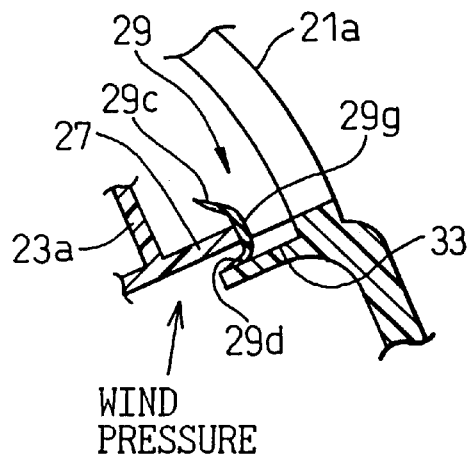
Figure 22A:
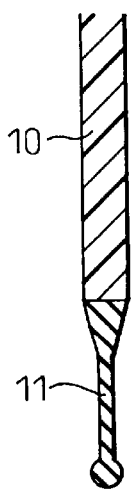
FIGS. 22A to 22C are views illustrating a conventional door for changing over the air passage.
Figure 22B:
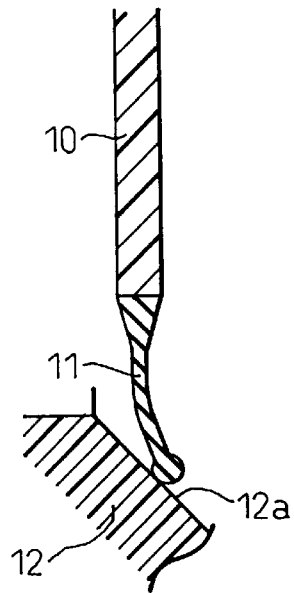
Figure 22C:
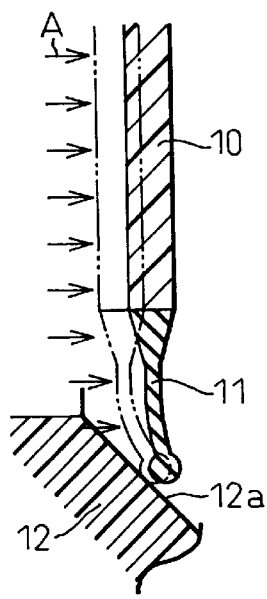
Figure 23A:
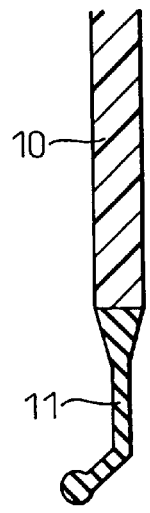
FIGS. 23A and 23B are views illustrating another conventional door for changing over the air passage.
Figure 23B:
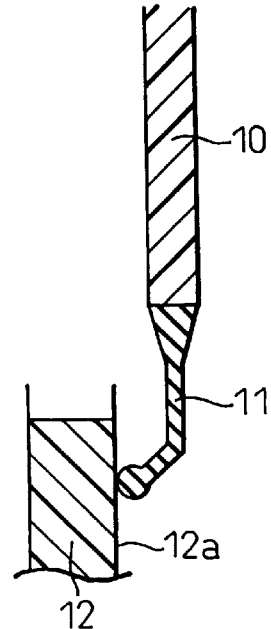
Figure 24A:
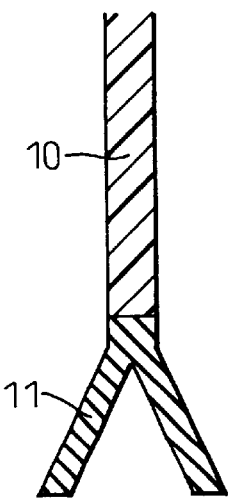
FIGS. 24A and 24B are views illustrating a further conventional door for changing over the air passage.
Figure 24B:
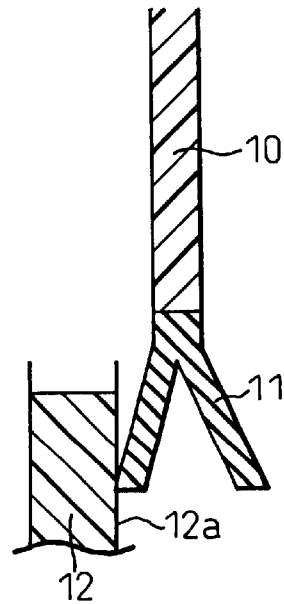

Next, the action and effect of the internal air/external air change-over door 23 of the eighth embodiment will be described in comparison with the comparative example. FIGS. 18 to 20 are views illustrating a comparative example and correspond to FIGS. 12, 15 and 16. Comparative example is different from the eighth embodiment in that the sealing members 28' and 29' of the internal air/external air change-over door 23 are simple lip seals of the shape of a flat plate.

In the internal air mode of FIG. 19 according to the comparative example, the wind pressure (dynamic pressure) created as the vehicle travels acts on the outer peripheral wall surface 23a of the door 23 closing the external air intake port 22. Due to the wind pressure, the sealing member 29' undergoes the elastic deformation in a direction away from the sealing surface 32 to form a gap S relative to the sealing surface 32. This permits the external air to enter into the internal air.

In the external air mode shown in FIG. 20, further, the external air intake port 22 is opened, and the wind pressure created as the vehicle travels acts on the whole region inside the casing of the internal air/external air change-over device 20. This time, therefore, the sealing member 29' is elastically deformed in the direction to separate away from the sealing surface 33 thereby to form a gap S relative to the sealing surface 33. Accordingly, the external air partly leaks into the compartment passing through the internal air intake port 21.

The internal air/external air change-over door 23 of the eighth embodiment, on the other hand, is provided with two kinds of sealing members 28 and 29 which are folded in the opposite directions as described earlier, eliminating the above-mentioned inconvenience of leakage of the external air.

Figure 17A:
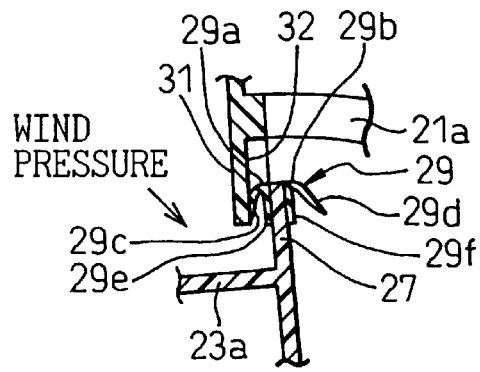
FIG. 17A is a sectional view illustrating a sealing member portion ① of FIG. 15 on an enlarged scale.
Figure 17B:
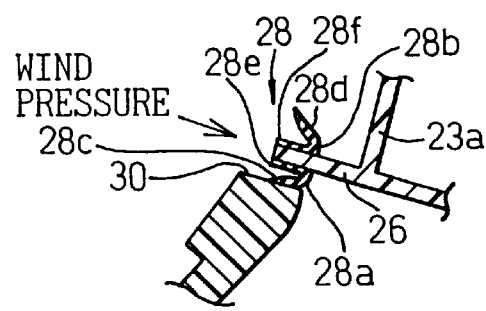
FIG. 17B is a sectional view illustrating a sealing member portion ② of FIG. 15 on an enlarged scale.

FIGS. 15, 17A and 17B illustrate a state of the internal air mode according to the eighth embodiment, wherein the sealing portions 28c and 29c of the sealing members 28 and 29 are pressed onto the sealing surfaces 30 and 32 to close the external air intake port 12. When the vehicle travels in a state where the external air intake port 22 is closed, the wind pressure (dynamic pressure) created by the traveling of the vehicle acts on the sealing members 28 and 29. However, since the sealing members 28 and 29 are folded in the opposite directions, the wind pressure causes the two sealing portions 28c and 29c to be pressed onto the sealing surfaces 30 and 32. In the internal air mode, therefore, there is no possibility that the external air leaks through the sealing surfaces 30 and 32.

Figure 17C:
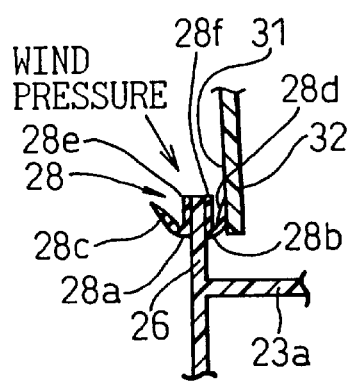
FIG. 17C is a sectional view illustrating a sealing member portion ③ of FIG. 15 on an enlarged scale.
Figure 17D:
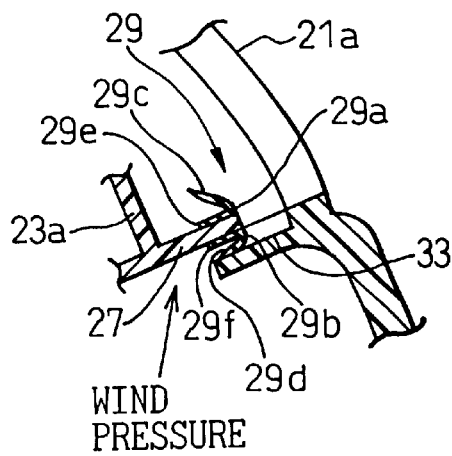
FIG. 17D is a sectional view illustrating a sealing member portion ④ of FIG. 15 on an enlarged scale.

FIGS. 16, 17C and 17D illustrate a state of the external air mode according to the eighth embodiment, wherein the sealing portions 28d and 29d of the sealing members 28 and 29 are pressed onto the sealing surfaces 31 and 33 to close the internal air intake port 21. When the vehicle travels in this state, the wind pressure created by the traveling of the vehicle acts on the sealing members 28 and 29. In this case, too, the wind pressure causes the two sealing portions 28d and 29d to be pressed onto the sealing surfaces 31 and 33. Therefore, there is no possibility that the external air leaks into the internal air intake port 21 through the sealing surfaces 31 and 33 in the external air mode. Thus, the sealing members 28 and 29 of the internal air/external air change-over door 23 are sealed by themselves due to the wind pressure (of the external air), eliminating the leakage of the external air despite the wind pressure acts thereupon.

Ninth Embodiment

In the eighth embodiment, the internal air/external air change-over door 23 is provided with two kinds of sealing members 28 and 29 which are folded in the opposite directions, i.e., provided with support portions 28a, 29a, sealing portions 28c, 29c, extended portions 28e, 29e, and with support portions 28b, 29b, sealing portions 28d, 29d and extended portions 28f, 29f of the sealing members 28 and 29, on the front and back surfaces of the outer edges (ends) of the flange portions 26 and 27 in a separated manner. According to a ninth embodiment as shown in FIGS. 21A to 21D, however, the portions corresponding the two support members 28a and 28b are formed as continuous support portions 28g and 29g.

The support portions 28g and 29g are thus secured to the end surfaces of the flange portions 26 and 27, and the extended portions 28e, 28f, 29e and 29f are omitted. According to the ninth embodiment, therefore, the support portions 28g and 29g have the same shape as the support portion 11g of the third embodiment shown in FIG. 5.

Other Embodiments

The above embodiments have dealt with the cases where the invention was applied to the blow-out-mode door and to the internal air/external air change-over door of the air conditioner for vehicles. The invention, however, can be further applied to an air-mixing door and the like doors. Further, the invention can be extensively used as a door for changing over the air passage in applications in addition to the air conditioners for vehicles.

In short, the invention can similarly be applied to the doors for changing over the air passages for various applications provided the door has a structure in which the sealing member of the lip seal type is secured to the outer peripheral edges of the door plate.

While the invention has been described by reference to specific embodiments chosen for purposes of illustration, it should be apparent that numerous modifications could be made thereto by those skilled in the art without departing from the basic concept and scope of the invention.

What is claimed is:

1. A door for changing over the air passage having a door plate (10) and a sealing member (11) of an elastic material secured to the outer peripheral edge of the door plate (10), said sealing member (11) being pressed onto a sealing surface (12a) of an air passage casing (12); wherein
said sealing member (11) is provided with support portions (11a, 11b, 11g) that extend in a direction to intersect said door plate (10), said support portions (11a, 11b, 11g) being directly supported by the outer peripheral edge of said door plate (10);
sealing portions (11c, 11d) pressed onto said sealing surface (12a) are so formed as to be headed toward the central portion of the door from said support portions (11a, 11b, 11g); and
said sealing member (11) is folded in cross section from the outer peripheral edge of said door plate (10) toward the central portion of the door due to said support portions (11a, 11b, 11g) and said sealing portions (11c, 11d).

2. A door for changing over the air passage according to claim 1, wherein said support portions (11a, 11b, 11g) and said sealing portions (11c, 11d) are provided on both the front and back surfaces of said door plate (10).

3. A door for changing over the air passage according to claim 1, wherein said support portions (11a, 11b, 11g) and said sealing portions (11c, 11d) are provided on either the front or back surface of said door plate (10).

4. A door for changing over the air passage according to claim 1, wherein said support portions (11a, 11b) are secured to the surfaces (10a, 10b) of the outer peripheral edges of said door plate (10).

5. A door for changing over the air passage according to claim 1, wherein said support portion (11g) is secured to an end surface (10c) of the outer peripheral edge of said door plate (10).

6. A door for changing over the air passage according to claim 1, wherein said sealing member (11) is an elastomer and is integrally formed on the outer peripheral edge of said door plate (10).

7. A door for changing over the air passage, comprising a butterfly door (D1) having a rotary shaft (13) arranged at the central portion of a door plate (10), wherein:
sealing members (11, 11') made of an elastic material are secured to the outer peripheral edges on one side and on the other side of said door plate (10) with said rotary shaft (13) as a boundary;
the sealing member (11) on one side of said door plate (10) is arranged on the lee side of a sealing surface (12a) of an air passage casing (12), and the sealing member (11') on the other side of the door plate (10) is arranged on the windward side of the sealing surface (12a) of said air passage casing (12); and
the sealing member (11) on said one side is folded so as to be pressed onto said sealing surface (12a) by the wind pressure, and said sealing member (11') on the other side of said door plate (10) is formed in the shape of a flat plate so as to be pressed onto said sealing surface (12a) by the wind pressure.

* * * * *

UNITED STATES PATENT AND TRADEMARK OFFICE
CERTIFICATE OF CORRECTION

PATENT NO. : 6,412,755 B2
DATED : July 2, 2002
INVENTOR(S) : Masahiro Ito

It is certified that error appears in the above-identified patent and that said Letters Patent is hereby corrected as shown below:

<u>Title page,</u>
Item [73], Assignees, "Shimizu Industry Col, Ltd." should be
-- Shimizu Industry Co., Ltd. --

Signed and Sealed this

Fourth Day of March, 2003

JAMES E. ROGAN
*Director of the United States Patent and Trademark Office*